United States Patent Office 3,538,105
Patented Nov. 3, 1970

3,538,105
NOVEL TRIARYLMETHANE DYESTUFFS
Wataru Yamaya and Sadao Fujino, Kitakyushu-shi, Japan, assignors to Mitsubishi Chemical Industries Limited, Tokyo, Japan, a corporation of Japan
No Drawing. Filed Feb. 15, 1966, Ser. No. 527,497
Claims priority, application Japan, Feb. 26, 1965, 40/10,743
Int. Cl. C07d 31/46; C09f 11/14
U.S. Cl. 260—294.9      2 Claims

ABSTRACT OF THE DISCLOSURE

A compound having the formula

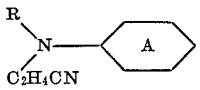

is reacted with a compound having the formula B—CHO to produce a leuco compound. The leuco compound is oxidized. The oxidation product is reacted with an acid to form a salt having the formula

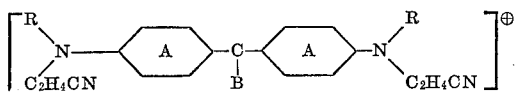

wherein in the above formulas A is a benzene nucleus substituted by an alkyl group or an alkoxy group having 1–2 carbons; R is H lower alkyl or lower alkyl containing chloro, hydroxyl, methoxy or cyano substitution; B is benzene, substituted benzene, naphthalene or substituted naphthalene, and $X^{\ominus}$ is an anion.

---

The invention relates to novel triarylmethane dyestuffs. More particularly, the invention is directed to providing novel triarylmethane dyestuffs suitable for colouring polyacrylic fibrous materials. Further, the invention is directed to providing a method of colouring polyacrylic fibres by use of the novel triarylmethane dyestuffs to heavy shades of violet, blue or green with good fastness to light, washing and heat treatment. Still further, the invention is directed to providing a method of the economical manufacture of such novel triarylmethane dyestuffs. Other objects and advantages of the invention will be apparent from the following description.

The novel triarylmethane dyestuffs according to the invention are compounds of the following general Formula I and carbinol bases corresponding thereto:

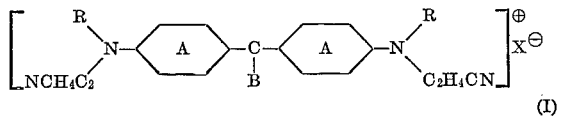

(I)

in which A denotes a benzene nucleus substituted by an alkyl- or an alpoxy group having one or two carbon atoms; R denotes a hydrogen atom or a lower alkyl group, which may have a substituent selected from the class consisting of a chlorine atom, hydroxyl, methoxy and cyano groups; B denotes a benzene- or a naphthalene nucleus, which may have substitutent; and $X^{\ominus}$ denotes an anion.

Namely, the novel triarylmethane dyestuffs of the present invention have at least two benezene nuclei, which have as substituted group a N-cyanoethyl-N-substituted amino- or a N-cyanoethylamino group and which are substituted by an alkyl- or an alpoxy group having one or two carbon atoms.

Referring to the above-mentioned general Formula I, the benzene nucleus A has as substituted group at least one from among methyl, ethyl, methoxy, and ethoxy groups; R may be, as for example, either a hydrogen atom or a substituted or non-substituted alkyl group such as a methyl-, an ethyl-, a propyl-, a hydroxyethyl-, a chloroethyl-, a cyanoethyl-, a 3-chloro-2-hydroxy-propyl-, or a 3-methoxy-2-hydroxy-propyl group; the benzene- or naphthalene nucleus B may have a substituent selected from the class consisting of a halogen atom, a nitro-, an alkyl-, an alpoxy-, an aryloxy-, and a N-substituted amino group such as a cyanoalkylamino-, a tolyl amino-, an anisidino amino-, a benzylamino-, a 4-phenylamino-phenylamino-, a 4-acetylamino-phenylamino-, or a phenylamino group.

B may be as for example:

A phenyl-, a naphthyl-, a phenoxyphenyl-, and a phenyl group having a nitro group such as m-nitrophenyl- or p-nitrophenyl group;

A phenyl group having halogen atom, such as a p-chlorophenyl-, a o-chlorophenyl-, a o-bromophenyl-, a o-fluorophenyl-, or a 2,6-dichlorophenyl group;

A phenyl group having a substituted or non-substituted alkyl group, such as a 4-methylphenyl-, a 4-methoxyphenyl- or a 3,4-methylene-dioxyphenyl group;

A N-alkyl substituted aminophenyl group such asa 4-(N-cyanoethyl-N-ethyl)-aminophenyl-, a 4-(N,N-biscyanoethyl)-aminophenyl- or a 4-(N-cyano-ethyl-N-benzyl)-aminophenyl group;

A N-arylaminophenyl group such as a 4-phenyl-aminophenyl-, a 4-(N-p'-anisidino)-aminophenyl-, a 4-(N-p'-phenetidino)-aminophenyl-, a 4-(N-2',4'-dimethoxyphenyl)-aminophenyl-, a 4-(N-tolyl)-aminophenyl-, a 4-(N-naphthyl)-aminophenyl-, a 4-[N-(N'-anisidino)-aminophenyl]-aminophenyl-, a 4-(N-pyridyl)-aminophenyl-, a 4-(N-4'-acetylaminophenyl)-aminophenyl-, a 4-(N-4'-n-propylaminophenyl)-aminophenyl-, or a 4-(N-4'-isopropoxylphenyl)-aminophenyl group;

A N-aryl-N-alkylaminophenyl group, such as a 4-(N-phenyl-N-ethyl)-aminophenyl-, a 4-(N-anisidino-N-cyanoethyl)-aminophenyl-, a 4-(N-benzyl-N-ethyl)-aminophenyl- or a 4-(N-tolyl-N-cyanoethyl)-aminophenyl group.

The anions indicated by $X^{\ominus}$ in the aforementioned Formula I include anions of acid phosphoric acid ester of polyhydric alcohol, formic-, acetic-, oxalic-, sulfamic-, N-substituted sulfamic-, sulfuric-, perchloric-, boric-, hydrochloric-, and hydrofluoric acids, zinc halide and hydroxy ion.

Various methods of the manufacture of the novel triarylmethane dyestuffs as indicated by the oforementioned Formula I according to the invention will now be illustrated:

(¹) A compound as indicated by the following Formula II:

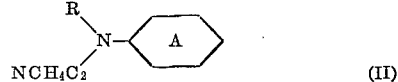

(II)

in which A and R are the same as those in the general Formula I and a compound as indicated by the following Formula III:

(III)

in which B is the same as B in the Formula I are subjected to condensation with or without an acid, urea and a suitable solvent to produce a leuco compound having the following Formula IV:

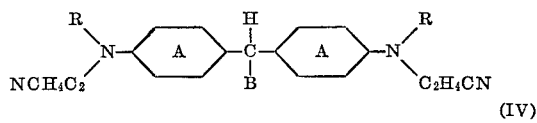

(IV)

in which A, B and R are the same as those in the Formula I, and the resultant leuco compound is oxidised by lead peroxide, bichromate, maganese oxide, or chloranil in water or a suitable solvent normally under acidic condition to obtain the aimed triarylmethane dyestuff.

(2) A bis-(N-substituted amino)-benzhydrol obtained by the reduction of bis-(N-substituted amino)-benzophenone or by the oxidation of bis-(N-substituted amnio)-diphenylmethane reacts with a suitable aryl compound and the resultant reaction product is subjected to oxidation to obtain the aimed triarylmethane dyestuff.

(3) Tris-(N - substituted amino) - triarylmethane dyestuffs, amongst the novel triarylmethane dyestuffs of the Formula I, may be manufactured by the reaction of a triarylmethane dyestuff of the following Formula V:

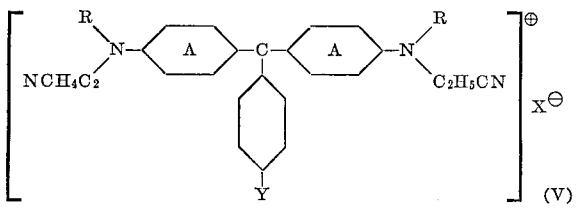

in which A, R and X are the same as those in the Formula I and Y denotes each members of the class consisting of a halogen atom, sulfo, nitro, hydroxy, and alkoxy groups and an aniline derivative such as for example aniline, anisidine, phenetidine, and dimethoxyaniline.

In any of the above-mentioned methods, the dyestuff is obtained either by salting-out or by the addition of as for example zinc chloride to the final reaction products. The dyestuff thus obtained is mixed with an acidic compound, if required, prior to the employment for colouring. In some instances, an acidic solution of the dyestuff is neutralised to separate the dyestuff as a free carbinol base of the following Formula VI:

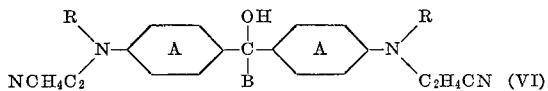

in which A, R and B are the same as those in the Formula I.

The carbinol base may be used either immediately or, more preferably, mixed with organic or inorganic acid before the employment. In some instances, the carbinol base is dissolved in a water missible organic solvent such as diethylene glycol, carbitols or formamides with or without addition of water thereto in the presence of acid such as acetic-, sulfamic-, or phosphoric acid and other additives to make up a thick solution or paste for colouring. The solution thus obtained may be mixed with water or a solvent before the employment for colouring fibrous materials or preparing an ink. The dyestuffs of the present invention may also be provided in the form of powder mixture containing a solid acid such as oxalic-, sulfamic- or boric acid, or an acid sulfate or a phosphate; or a solid diluent such as sugar, dextrin, starch or inorganic salts. In some instances, the standardized type of the dyestuff (in either solid or liquid form) may contain cationic or non-ionic surfactant and/or higher hydrocarbons.

The novel triarylmethane dyestuffs of the invention are especially suitable for colouring polyacrylic fibres made of pure polyacrylonitrile or of acrylonitrile copolymers with up to about 50% of other vinyl compounds, such as vinyl haolgenide, vinylidene chloride, vinyl acetate, vinyl pyridine, acrylic acid ester, methacrylic acid ester or acryl amide.

The dyeing of polyacrylic fibres employing the novel triarylmethane dyestuffs of the invention may be carried out in an aqueous dye bath containing the dyestuffs, organic or inorganic acid or salts thereof. The fibres are immersed in the dye bath usually at a temperature 20–60° C., which is then raised carefully so as to avoid uneven dyeing. The dyeing continues to further 30–200 minutes at 80–110° C., preferably at 90–105° C., until the fibres are given desired shades.

Various types of dyeing auxiliaries such as retarder, leveling agent, wetting agent, carrier and organic solvent may be employed in the course of dyeing processes.

The printing of polyacrylic fibres employing the dyestuffs of the present invention is carried out by use of a colour paste made of the dyestuffs having the aforementioned Formula I, thickner, other auxiliaries and water. The fibres are printed and dried, if required, and steamed at a temperature of from 90° C. to 105° C. for 10 to 60 minutes. Nafka crystal gum or starch is a preferred thickner. Also solubilizing agent such as thioethylenediglycol or urea, an acid such as acetic-, formic-, maleic-, or tartaric acid, accelerator carrier such as resorcin or glycine PED, and anti-reducing agent such as sodium chlorate are useful printing auxiliaries.

As has been described in details the dyestuffs of the Formula I dye polyacrylic fibres to heavy shades of violet, blue or green with excellent fastness to light, washing and heat treatment.

TABLE I

| No. | Dyestuff cation | Fastness to light [1] | | | Buildup |
|---|---|---|---|---|---|
| | | Vonnel-17 | Cashimilon-F | Explan-D | |
| 1A [2] | (structure with $NCH_4C_2$, $H_3C$, $CH_3$, $C_2H_4CN$, $CH_3$, $CH_3$, Cl) | 6 | 6 | 6 | Better. |
| 1B [2] | (structure with $NCH_4C_2$, $H_3C$, $CH_3$, $C_2H_4CN$, Cl) | 4–5 | 4 | 4 | Control. |

(U.S.P. 3,021,344)

TABLE I—Continued

| No. | Dyestuff cation | Fastness to light[1] | | | Buildup |
|---|---|---|---|---|---|
| | | Vonnel-17 | Cashimilon-F | Explan-D | |
| 5A[2] | (structure) | 6–7 | 6 | 6–7 | Almost equal. |
| 5B[2] | (structure, C.I. Basic Blue 26) | 2 | 2 | 2 | Control. |
| 5B'[2] | (structure) | 3–4 | | | Almost equal. |

[1] JIS L 1044 (1959) Fade-O-meter test, standard depth (JIS L 802); Cashimilon-F (Asahikasei Ind. Ltd), Exlan-D (Japan Exlan Co. Ltd) and Vonnel-17 (Mitsubishi Rayon Ind. Ltd) are the registered trade names of polyacrylic fibres available in Japan.
[2] A denotes the novel triarylmethane dyestuffs of the invention and B and B' denote the known dyestuffs.

By reference to the following Table I it will be understood that the novel triarylmethane dyestuffs of the invention are excellent especially in fastness to light and build up as compared with known dyestuffs as for example disclosed in U.S. Pat. No. 3,021,344 having a general structure similar to the aforementioned Formula I in which R is alkyl group having one to two carbon atoms, B is o-chlorophenyl group and benzene nucleus A has no substituent.

Some embodiments of the invention will now be set forth as for example and not in any limiting sense in which "part" and "%" imply "part by weight" and "percent by weight," respectively, and the maximum wave length (λ max) denotes the absorption wave length of visible range measured in a methanol solution containing 0.1% acetic acid.

EXAMPLE 1

36 parts of N-cyanoethyl-N-ethyl-m-toluidine and 10 parts of benzaldehyde were heated to 80–85° C. for 10–12 hrs. in the presence of 3 parts of urea and 15 parts of conc sulfuric acid with isopropyl alcohol, the reaction mixture thus obtained was neutralised with an aqueous soda solution and alcohol was distilled off. After cooling, the residue was separated and recrystallized from alcohol. The leuco compound thus obtained was dissolved in 150 parts of methanol containing 40 parts of 35% hydrochloric acid to which was added 30 parts of lead peroxide at 40–50° C. for an hour. After reaction, 30 parts of Glauber's salt were added, the reaction mixture was filtered, and the filtrate was diluted with water and neutralized with ammonia. The carbinol base thus obtained was collected, mixed with sulfamic acid and dried.

The dyestuff (λ max.=448; 640 mμ) thus obtained had the following Formula VII:

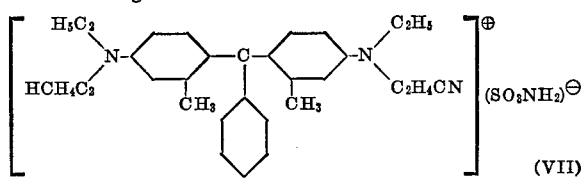

(VII)

0.1 part of this dyestuff was dissolved in 400 parts of water. 0.4 part of acetic acid, 0.2 part of sodium acetate, an appropriate quantity of Glauber's salt and retarder were added to the solution in which 10 parts of the Vonnel-17 yarn were immersed. The solution was heated up to 90° C. in 30 minutes, and further heated to 95 to 100° C. in 10 minutes. The dyeing was carried out for one hour at this temperature. The dyed yarn was then washed by luke warm water, subjected to soaping in 500 parts of TABLE I—Continued

| No. | Dyestuff cation | Fastness to light [1] | | | Buildup |
| --- | --- | --- | --- | --- | --- |
| | | Vonnel-17 | Cashimilon-F | Explan-D | |
| 2A [1] | (structure: $H_5C_2$, $NCH_4C_2$—N—, ring with $CH_3$, $C_2H_5$/$C_2H_4CN$ amine, $CH_3$, central C, phenyl) | 7 | 7 | 7 | Better. |
| 2B [2] | (structure: $H_5C_2$, $NCH_4C_2$—N—, ring, $C_2H_5$/$C_2H_4CN$ amine, central C, phenyl) | 5 | 4-5 | 4-5 | Control. |
| 2B′ [2] | (structure: $H_5C_2$, $NCH_4C_2$—N—, ring, central C, $C_2H_5$/$C_2H_4CN$ amine, —Cl-phenyl) (U.S.P. 3,021,344) | 5 | | 4-5 | Almost equal. |
| 3A [2] | (structure: H—N—$NCH_4C_2$, ring with $CH_3$, ring with $CH_3$, N—H $C_2H_4CN$, central C, phenyl) | 6-7 | 5-6 | 6 | Much better. |
| 3B [2] | (structure: H—N—$NCH_4C_2$, two rings, N—H $C_2H_4CN$, central C, phenyl) | 5-6 | 4 | 5-6 | Control. |
| 4A [2] | (structure: H—N—$NCH_4C_2$, ring with $OCH_3$, ring with $OCH_3$, N—H $C_2H_4CN$, central C, —Cl-phenyl) | 6-7 | 6 | 6 | Better. |
| 4B [2] | (structure: H—N—$NCH_4C_2$, two rings, N—H $C_2H_4CN$, central C, —Cl-phenyl) | 5 | 4 | 5 | Control. | soaping bath containing 0.5 part of detergent for 10 minutes at 80 to 90° C. and further washed by water. The Vonnel yarn was dyed to clear, heavy yellowish green shades of good fastness to light and washing.

N-cyanoethyl-N-hydroxyethyl-m-toluidine, N-biscyanoethyl - m - toluidine, N-cyanoethyl-N-chloroethyl-m-toluidine, N - cyanoethyl - N - 3 - methoxy-2-hydroxypropyl-m-toluidine, or N-cyanoethyl-N-propyl-m-toluidine employed for the N-cyanoethyl-N-ethyl-m-toluidine mentioned above resulted in dyestuffs, which dyed polyacrylic fibres to green to yellowish green shades with good fastness.

EXAMPLE 2

70 parts of paste prepared from 100 parts of starch thickner and 150 parts of water and 30 parts of paste prepared from 100 parts of Nafka crystal gum and 200 parts of water were mixed to prepare 100 parts of original paste.

0.5 part of the dyestuff ($\lambda$ max. 405; 608 m$\mu$) having the following Formula VIII:

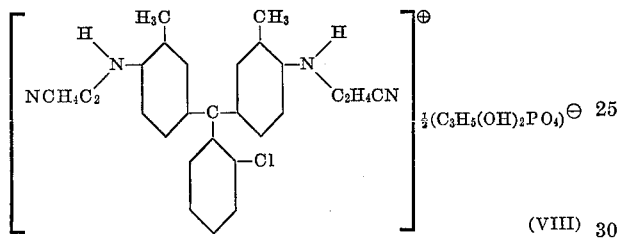

3 parts of thiodiethylene glycol, 1 part of urea, 5 parts of 30% acetic acid and 2 parts of 50% tartaric acid were dissolved in a least quantity of hot water. The resulting solution was admixed with 60 parts of said original thickener, followed by the addition of 4 parts of 50% resorcin solution and water to prepare 100 parts of colour paste.

The Vonnel-17 muslin was printed by use of said colour paste, dried, and then steamed at 100° C. for 30 minutes. The muslin was then rinsed and dried. The muslin was thus printed in brilliant blue shades with good fastness.

The dyestuff of a similar structure having o-bromophenyl group or o-fluorophenyl group, in place of o-chlorophenyl group, in the Formula VIII, also gave said muslin similar shades of good fastness.

EXAMPLE 3

49 parts of N-cyanoethyl-N-ethyl-m-toluidine and 18.3 parts of p-chlorobenzaldehyde were heated together with 3.9 parts of urea and 26 parts of sulfuric acid in the presence of isopropyl alcohol. Upon completion of the reaction, reaction mass was diluted with water and isopropyl alcohol was removed by distillation. After the cooling of the resulting mixture, precipitate leuco compound was collected by filtration. The leuco compound was dissolved in methanol containing hydrochloric acid and oxidized as in Example 1. The resulting carbinol base was dissolved in luke warm water containing phosphoric acid, filtered to remove insoluble matter, and separated by the addition of sodium dihydrogen phosphate. The dyestuff ($\lambda$ max. =451; 650 m$\mu$) thus obtained had the following Formula IX which gave polyacrylic fibres brilliant yellowish green shades of excellent fastness to light.

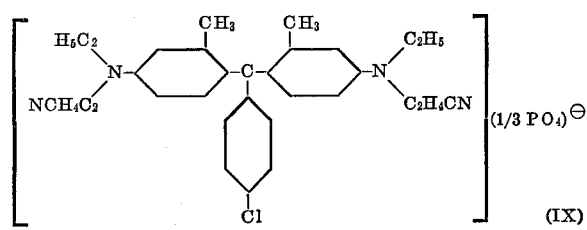

EXAMPLE 4

37.6 parts of N-cyanoethyl-N-ethyl-m-toluidine and 13.6 parts of p-anisaldehyde were heated in the presence of chlorobenzene, urea and sulfuric acid. The reaction mixture thus obtained was subjected to distillation, chlorobenzene was removed, and remaining leuco compound was dissolved in methanol containing hydrochloric acid. The leuco compound contained in the resulting solution was oxidized by lead peroxide added thereto in an equivalent amount at room temperature, followed by neutralization. The resulting carbinol base was mixed with sulfamic acid to obtain a dyestuff ($\lambda$ max.=488; 617 m$\mu$) of the following general formula:

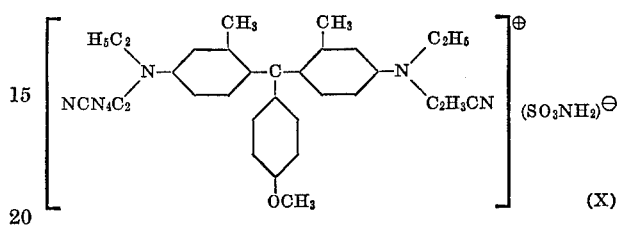

The abovementioned dyestuff dyed polyacrylic fibres to dark bluish green shades of good fastness to light and washing.

EXAMPLE 5

15 parts of carbinol base obtained in Example 3 reacted with 6 parts of phenol at 80-83° C. for 3 hours. Upon completion of the reaction, water was added to the reaction mixture to precipitate carbinol base which was then thoroughly washed by water, mixed with sulfamic acid, and dried. The dyestuff ($\lambda$ max.=631 m$\mu$) thus obtained had the following general Formula XI, which dyed polyacrylic fibres to fast dark green shades:

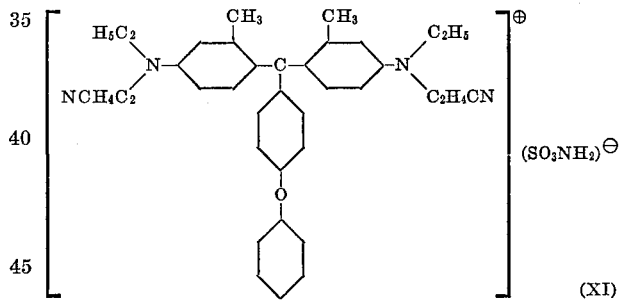

EXAMPLE 6

6.2 parts of phosphate of the dyestuff obtained in Example 3 reacted with 2.2 parts of p-anisidine in the presence of 0.2 part of hydrochloric acid and 15 parts of water at 80° C. for 12 hours. Upon completion of the reaction, the reaction mass was collected and dissolved in methanol. After the removal of insoluble matter, the solution was added to aqueous ammonia to precipitate carbinol base, which was collected and dried. The carbinol base thus obtained was mixed with sulfamic acid and dried to obtain a dyestuff ($\lambda$ max.=601 m$\mu$) of the following general Formula XII:

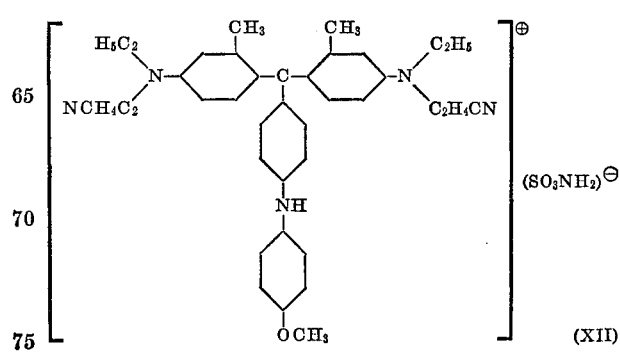

The dyestuff dyed polyacrylic fibres to brilliant heavy reddish blue shades of good fastness.

EXAMPLE 7

4 parts of the dyestuff obtained in Example 4 reacted with 24 parts of p-phenetidine at 120° C. for 4 hours. The reaction mass was added to 120 parts of 5% hydrochloric acid to precipitate a dyestuff ($\lambda$, max.=603 m$\mu$)

of the following general Formula XIII:

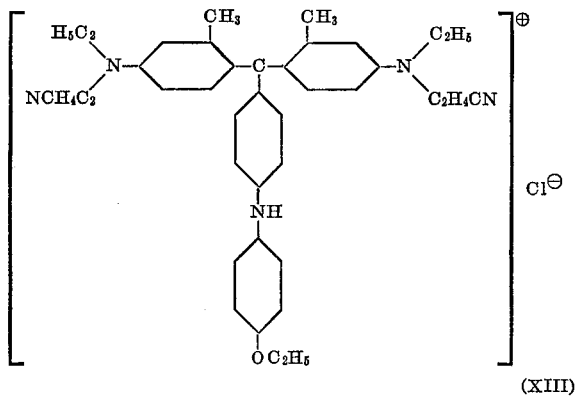

(XIII)

The dyestuff was dissolved in dilute acetic acid and dyed polyacrylic fibres to brilliant reddish blue shades of good fastness.

EXAMPLE 8

7.5 parts of N-ethyl-N-cyanoethyl-m-toluidine, 0.6 part of urea, and 3.7 parts of 2-methoxy-1-napthaldehyde were dissolved in isopropyl alcohol and boiled for reaction in the presence of 2.2 parts of sulfuric acid for 12 hours. The resulting reaction mixture was neutralized by the addition of sodium acetate, isopropyl alcohol was removed by distillation, and residue thus obtained was dissolved in methanol containing hydrochloric acid. The resulting solution was oxidized by the addition of lead peroxide and neutralized by dilute aqueous ammonia to obtain a carbinol base of the following general Formula XIV:

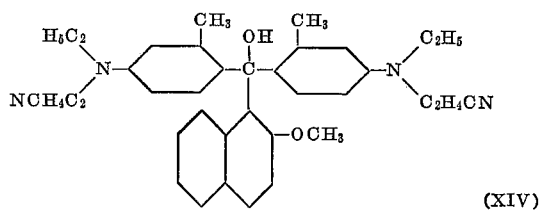

(XIV)

This carbinol base was dissolved in acetic acid and dyed polyacrylic fibres in an acidic dye bath to green shades with good fastness.

EXAMPLE 9

Table II shows the maximum absorption wave length and the shades given to polyacrylic fibres by the dyestuffs in accordance with the invention which had the following general Formula XV:

in which Q and B are as illustrated in the table.

In view of that the kind of anion does not substantially affect the maximum absorption wave lengths of dyestuffs and shades given to dyed material, no reference was made in Table II to the kind of anion of individual dyestuffs.

TABLE II

| Q-group | B-group | Shade | Maximum absorption wave length (m$\mu$) |
|---|---|---|---|
| —⌬(C$_2$H$_5$)—NHC$_2$H$_4$CN | —⌬—NO$_2$ | Blue | 407, 610 |
| Same as above | —⌬ | do | 415, 598 |
| —⌬(OCH$_3$)—NHC$_2$H$_4$CN | —⌬—Cl | Bluish green | 435, 643 |
| —⌬(OC$_2$H$_5$)—NHC$_2$H$_4$CN | Same as above | do | 435, 643 |
| —⌬(CH$_3$)(H$_3$C)—N(C$_2$H$_4$CN) | —⌬—N(C$_2$H$_5$)(C$_2$H$_4$CN) | Blue | 600 |
| Same as above | —⌬—N(C$_2$H$_4$CN)$_2$ | Violet | 585 |
| Do | —⌬(Cl) | Yellowish green | 442, 630 |
| Do | —⌬ | Bluish green | 425, 643 |
| —⌬(C$_2$H$_5$)(H$_3$C)—N(C$_2$H$_4$CN) | —⌬—N(C$_2$H$_4$CN)$_2$ | Blue | 604 |

TABLE II—Continued
| Q-group | B-group | Shade | Maximum absorpt on wave length (mμ) |
|---|---|---|---|
| Same as above | 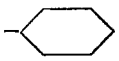 | Yellowish green. | 448, 640 |
| Do | 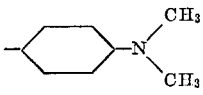 | Blue | 605 |
| Do | 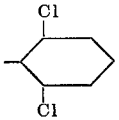 | Bluish green. | 420, 673 |
| Do | 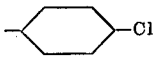 | Yellowish green. | 451, 650 |
| 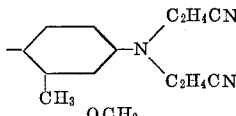 | 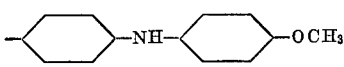 | Violet | 603 |
| 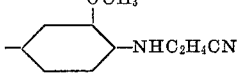 | 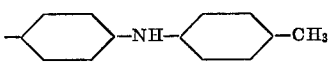 | Blue | 606 |
| Same as above | 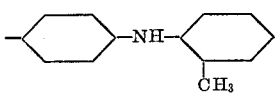 | Dark violet. | 592 |
| 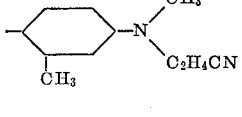 | 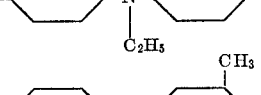 | do | 600 |
| Same as above | 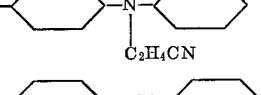 | do | 601 |
| Do | 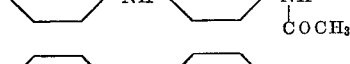 | do | 605 |
| Do | 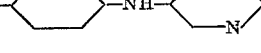 | Dark blue | 599 |
| 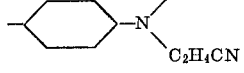 | 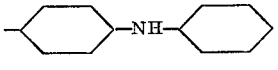 | Blue | 603 |
| Same as above | 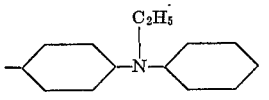 | do | 601 |
| Do | 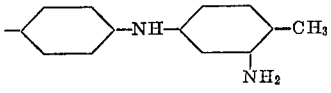 | do | 604 |
| Do | 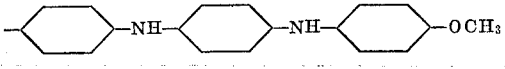 | Navy blue | 605 |
| Do | 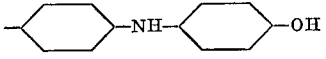 | Blue | 602 |
| Do | 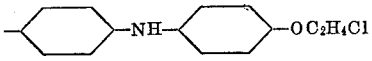 | do | 603 |
| Do | 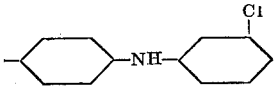 | do | 603 |
| Do | 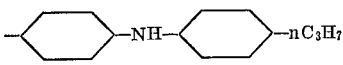 | do | 605 |

TABLE II—Continued

| Q-group | B-group | Shade | Maximum absorption wave length (mμ) |
|---|---|---|---|
| Do |  | Bluish violet. | |
| Do |  | Blue | 605 |
| Do | 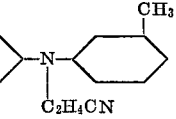 | ...do... | 605 |
| Do | 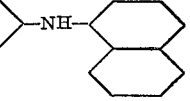 | ...do... | 600 |
| Do | 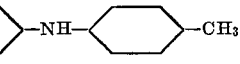 | ...do... | 605 |
| Do | 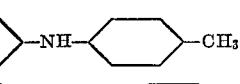 | Dark blue. | |
| Do | 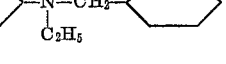 | Blue | 606 |
| 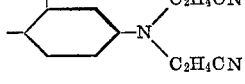 | 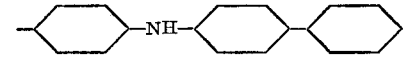 | ...do... | 612 |
| Same as above | 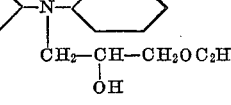 | ...do... | 606 |
| Do | 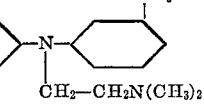 | ...do... | 606 |
| Do | 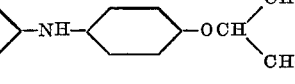 | ...do... | 607 |
| 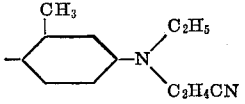 |  | Dark blue. | |
| Same as above | 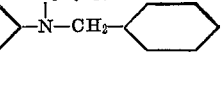 | Blue | 608 |

EXAMPLE 10

60 parts of an aqueous dyestuff paste (purity 30%) prepared in Example 1 were thoroughly mixed with 8 parts of sulfamic acid, 0.5 part of Emulgen #920 (a non-ionic surfactant manufactured by a Kaō Soap Co. Ltd.) and 40 parts of boric acid and dried at 50° C. The thus obtained dry cake was puverized to make up 100 parts by the addition of boric acid. The dyestuff composition thus obtained was found easily soluble in water.

EXAMPLE 11

25 parts of dry carbinol base prepared in Example 6 was stirred for an hour while adding thereto 15 parts of sulfamic acid, 50 parts of water, 40 parts of diethylene glycol, and 0.5 part of nonyl phenol polyethylene glycol ester at 40–50° C. There was obtained a thick solution, which was miscible with a mixture of any proportions of water and glycols for the employment in dyeing and printing.

Ethyl carbitol and butyl carbitol thiodiethylene glycol may be substituted for the said diethylene glycol.

What we claim is:

1. Triarylmethane dyestuffs having the general formula:

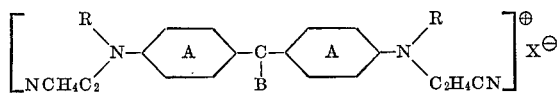

in which A denotes a benzene nucleus substituted by a methyl, ethyl, methoxy or ethoxy group; R denotes a hydrogen atom, a lower alkyl group, or a lower alkyl group having a substituent selected from the class consisting of a chlorine atom, a hydroxy group, a methoxy group, and a cyano group; B denotes a benzene nucleus, an acenaphthene nucleus, a naphthalene nucleus, or a benzene nucleus substituted with a halogen atom, an alkyl group, a phenoxy group, a nitro group or an amino group having a substituent selected from the class consisting of alkyl-, cyanoalkyl-, hydroxyalkyl-, alkoxyalkyl-, dialkylaminoalkyl-, phenlalkyl-, phenyl, alkylphenyl-, alkoxyphenyl-, oxyphenyl-, aminophenyl-, acetylaminophenyl-, alkoxyphenylaminophenyl-, halogenoalkoxyphenyl-, diphenyl-, naphthyl-, and pyridyl groups; and X- denotes an anion.

2. The carbinol bases respectively corresponding to the triarylmethane dyestuffs as defined in claim 1.

References Cited

UNITED STATES PATENTS

| | | | |
|---|---|---|---|
| 3,021,344 | 2/1962 | Baer | 260—393 |
| 3,423,427 | 1/1969 | Cescon et al. | 260—393 |

LORRAINE A. WEINBERGER, Primary Examiner

L. A. THAXTON, Assistant Examiner

U.S. Cl. X.R.

8—55; 260—340.5, 388, 391, 393, 465